(12) United States Patent
Zhang et al.

(10) Patent No.: US 9,602,368 B1
(45) Date of Patent: Mar. 21, 2017

(54) IDENTIFIER QUALITY

(71) Applicant: Google Inc., Mountain View, CA (US)

(72) Inventors: Mingwu Zhang, Sunnyvale, CA (US);
Prajakta Kalekar, Santa Clara, CA (US); Damian Reeves, Menlo Park, CA (US); Benjamin William Clark, New York, NY (US)

(73) Assignee: Google Inc., Mountain View, CA (US)

( * ) Notice: Subject to any disclaimer, the term of this patent is extended or adjusted under 35 U.S.C. 154(b) by 210 days.

(21) Appl. No.: 14/212,198

(22) Filed: Mar. 14, 2014

(51) Int. Cl.
*H04L 12/26* (2006.01)
*H04L 29/08* (2006.01)

(52) U.S. Cl.
CPC ............ *H04L 43/04* (2013.01); *H04L 67/146* (2013.01)

(58) Field of Classification Search
CPC .............................. H04L 43/04; H04L 67/146
See application file for complete search history.

(56) References Cited

U.S. PATENT DOCUMENTS

| | | | |
|---|---|---|---|
| 6,851,060 B1 * | 2/2005 | Shrader ............. | G06F 17/30861 707/999.009 |
| 7,146,353 B2 | 12/2006 | Garg et al. | |
| 8,504,456 B2 * | 8/2013 | Griffin ................... | G06Q 40/00 705/35 |
| 8,583,775 B2 | 11/2013 | Lu et al. | |
| 2003/0023481 A1 * | 1/2003 | Calvert ................. | G06Q 30/02 705/14.53 |
| 2004/0073660 A1 * | 4/2004 | Toomey ................ | H04L 63/108 709/224 |
| 2005/0015601 A1 * | 1/2005 | Tabi ..................... | G06F 21/6227 713/182 |
| 2008/0046576 A1 * | 2/2008 | Wahl .................... | H04L 61/1517 709/228 |
| 2009/0210331 A1 * | 8/2009 | Boone .................. | G06Q 40/125 705/32 |
| 2010/0114716 A1 * | 5/2010 | Heilig ................... | G06Q 30/02 705/14.71 |
| 2010/0305988 A1 * | 12/2010 | Agarwal ............... | G06Q 30/02 705/7.41 |
| 2011/0302025 A1 * | 12/2011 | Hsiao .................... | G06Q 30/02 705/14.42 |
| 2013/0145022 A1 * | 6/2013 | Srivastava .......... | G06Q 30/0241 709/224 |

* cited by examiner

*Primary Examiner* — Brian J Gillis
*Assistant Examiner* — Gil H. Lee
(74) *Attorney, Agent, or Firm* — Fish & Richardson P.C.

(57) ABSTRACT

Methods, systems, and apparatus include computer programs encoded on a computer-readable storage medium, including a method for providing information about cookies. Input is received from a data provider, the input including one or more cookies associated with users in a network. Each cookie is evaluated, and an activity level in the network for a given cookie is determined. A threshold activity level is determined. Inactive cookies are identified based on the determined activity level of a respective cookie and the threshold activity level. Inactive cookies are reported.

20 Claims, 4 Drawing Sheets

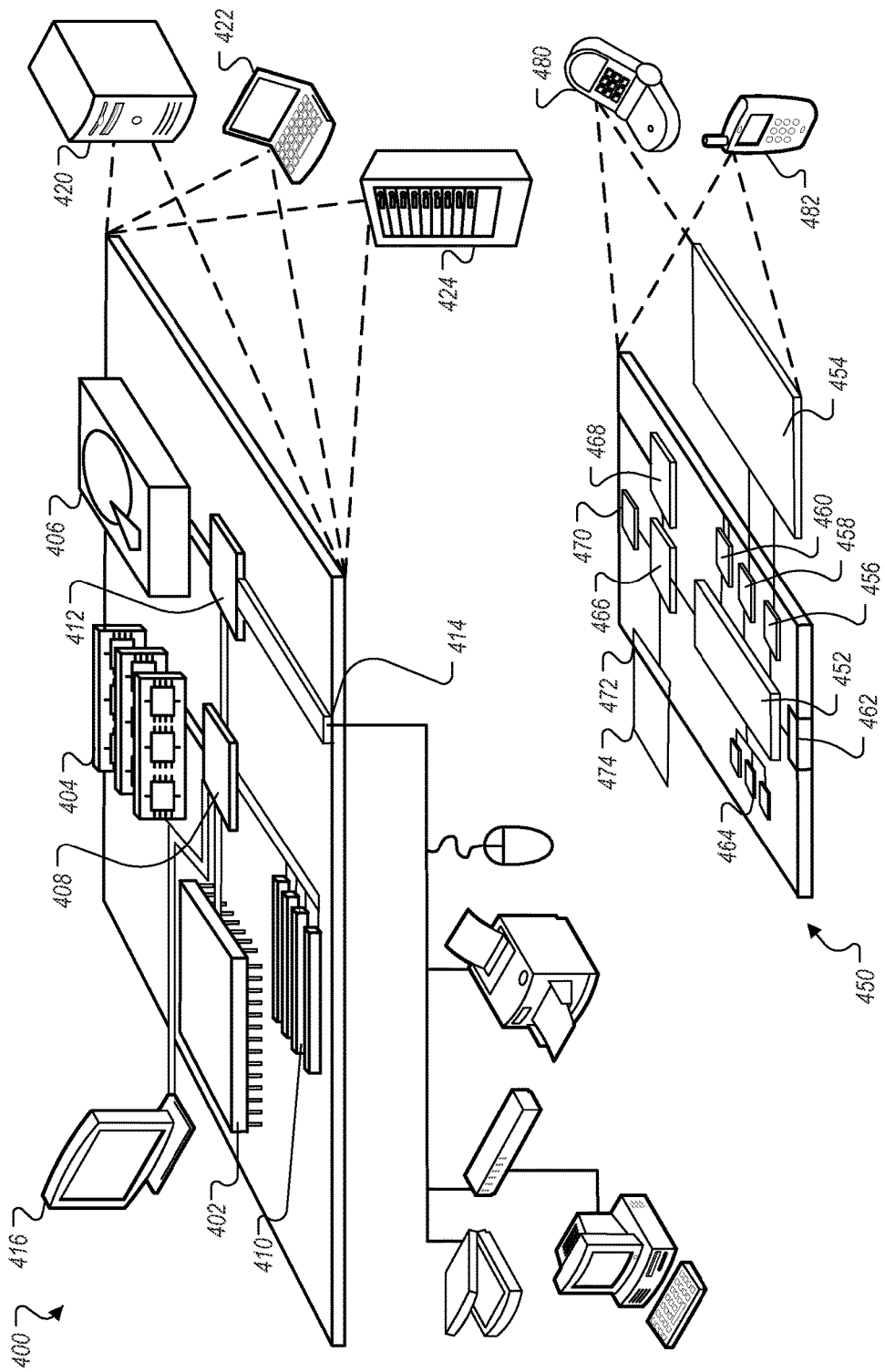

IDENTIFIER QUALITY

BACKGROUND

This specification relates to information presentation.

The Internet provides access to a wide variety of resources. For example, video and/or audio files, as well as webpages for particular subjects or particular news articles, are accessible over the Internet. Access to these resources can result in the generation, update and use of identifiers (e.g., Internet cookies) to facilitate the user experience. Identifiers can be stored on a user device and provided when a user repeats a visit to a specific resource. The identifiers can be used by sponsors associated with a given resource to provide a tailored experience for the user.

SUMMARY

In general, one innovative aspect of the subject matter described in this specification can be implemented in methods that include a computer-implemented method for providing information about cookies. The method includes receiving input from a data provider, the input including one or more cookies associated with users in a network. The method further includes, for each cookie, evaluating the cookie and determining an activity level in the network for a given cookie. The method further includes determining, using one or more processors, a threshold activity level. The method further includes identifying inactive cookies based on the determined activity level of a respective cookie and threshold activity level. The method further includes reporting inactive cookies.

These and other implementations can each optionally include one or more of the following features. Receiving input can include receiving a user list that includes a plurality of entries, each entry including a cookie. Determining the activity level in the network for a given cookie can include determining, in a time period, a number of times that the cookie has been seen, and comparing the number of times to a threshold associated with the threshold activity level. Receiving input can include receiving input to add the one or more cookies to a user list associated with the data provider, and reporting inactive cookies can include reporting back to the data provider which of the provided one or more cookies are deemed inactive. The method can further include adding the cookies to the user list irrespective of activity level. The method can further include comprising periodically evaluating the user list to determine a quality of entries in the user list, including evaluating each cookie associated with the user list as to the threshold activity level, and wherein reporting includes reporting the quality of the user list as a measure of a number of inactive cookies that are associated with the user list. Reporting inactive cookies can include reporting inactive cookies to the data provider responsive to the received input. Reporting inactive cookies can be periodic and can include evaluating all cookies in the user list and reporting a quality of the user list based on the evaluating. The quality can be measured in terms of number of inactive cookies to active cookies. Reporting can include reporting a quality of the user list to a potential entity that may use or access the user list. Reporting the quality can include reporting a percentage of inactive cookies in the user list. The activity level can be based on activity or inactivity in the network, an age of the cookie, or a time since a last cookie match. Reporting can include reporting a likelihood that a certain cookie is inactive. The method can further include, when the number of inactive cookies is above a first threshold, triggering a cookie-matching process for the data provider. Reporting can include providing information for presenting a user interface dashboard to the data provider that includes cookie activity information and quality information associated with one or more user lists that include cookies that the data provider has submitted.

In general, another innovative aspect of the subject matter described in this specification can be implemented in computer program products that include a computer program product tangibly embodied in a computer-readable storage device and comprising instructions. The instructions, when executed by one or more processors, cause the processor to: receive input from a data provider, the input including one or more cookies associated with users in a network; for each cookie, evaluate the cookie and determining an activity level in the network for a given cookie; determine a threshold activity level; identify inactive cookies based on the determined activity level of a respective cookie and threshold activity level; and report inactive cookies.

These and other implementations can each optionally include one or more of the following features. Receiving input can include receiving a user list that includes a plurality of entries, each entry including a cookie. Determining the activity level in the network for a given cookie includes determining, in a time period, a number of times that the cookie has been seen, and comparing the number of times to a threshold associated with the threshold activity level.

In general, another innovative aspect of the subject matter described in this specification can be implemented in systems, including a system comprising one or more processors and one or more memory elements including instructions. The instructions, when executed, cause the one or more processors to: receive input from a data provider, the input including one or more cookies associated with users in a network; for each cookie, evaluate the cookie and determining an activity level in the network for a given cookie; determine a threshold activity level; identify inactive cookies based on the determined activity level of a respective cookie and threshold activity level; and report inactive cookies.

These and other implementations can each optionally include one or more of the following features. Receiving input can include receiving a user list that includes a plurality of entries, each entry including a cookie.

Particular implementations may realize none, one or more of the following advantages. Data providers can obtain information about the quality of their user lists, the percentage or number of inactive cookies, and/or probabilities associated with each cookie's likelihood be being inactive. Data providers can use metrics associated with user lists and cookies to determine if and how user lists should be used.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a block diagram of an example computer system that can be used to implement the methods, systems and processes described in this disclosure.

Like reference numbers and designations in the various drawings indicate like elements.

DETAILED DESCRIPTION

Systems, methods, and computer program products are described for evaluating identifier quality. Identifiers can be stored on a user device based on a user's navigation to and interactions with a specific resource. The identifier can be provided to a specific resource upon a subsequent interaction with the specific resource as a means to pass information related to prior interactions of the user with the specific resource. The identifier can include both interaction data and a specific identifier that is associated with the user. A cookie is one form of identifier, and the materials below describe methods and systems for evaluating cookie quality. Other forms of identifiers are possible. For example, a system can receive input from a data provider that includes a user list. The user list can include a definition that defines a characteristic (or plural characteristics) that are shared by each member in the user list. Each entry in the list can include an identifier that identifies (either locally or globally) a specific user that meets the definition. User lists can be created by a data provider based on owned or permissioned data. User lists can be exchanged, marketed or otherwise used to facilitate the delivery of relevant content to users that are included on the user lists. For example, a user list can include a first definition and a plurality of entries, wherein each entry includes a cookie associated with a user that satisfies the definition. The system can evaluate each cookie, including determining an activity level, such as the activity level in a specific network for each cookie. A threshold activity level can be determined, by which cookies are to be determined to be active cookies or inactive cookies. For example, the system can use the threshold activity level to determine if a respective cookie is inactive, e.g., based on the activity level of the respective cookie in comparison with the threshold activity level. The system can report on inactive cookies, such as to the data provider. For example, reporting inactive cookies can include identifying specific cookies that are inactive. In some implementations, the system can report on the quality of a user list provided by the data provider, such as determining the quality based at least in part on a percentage of cookies that are included in a user list that are determined to be inactive. Although the examples given here describe ways, for example, for determining whether cookies are inactive, and for determining the quality of user lists, the same or similar techniques can be used for other user-related identifying systems.

Figure 1:
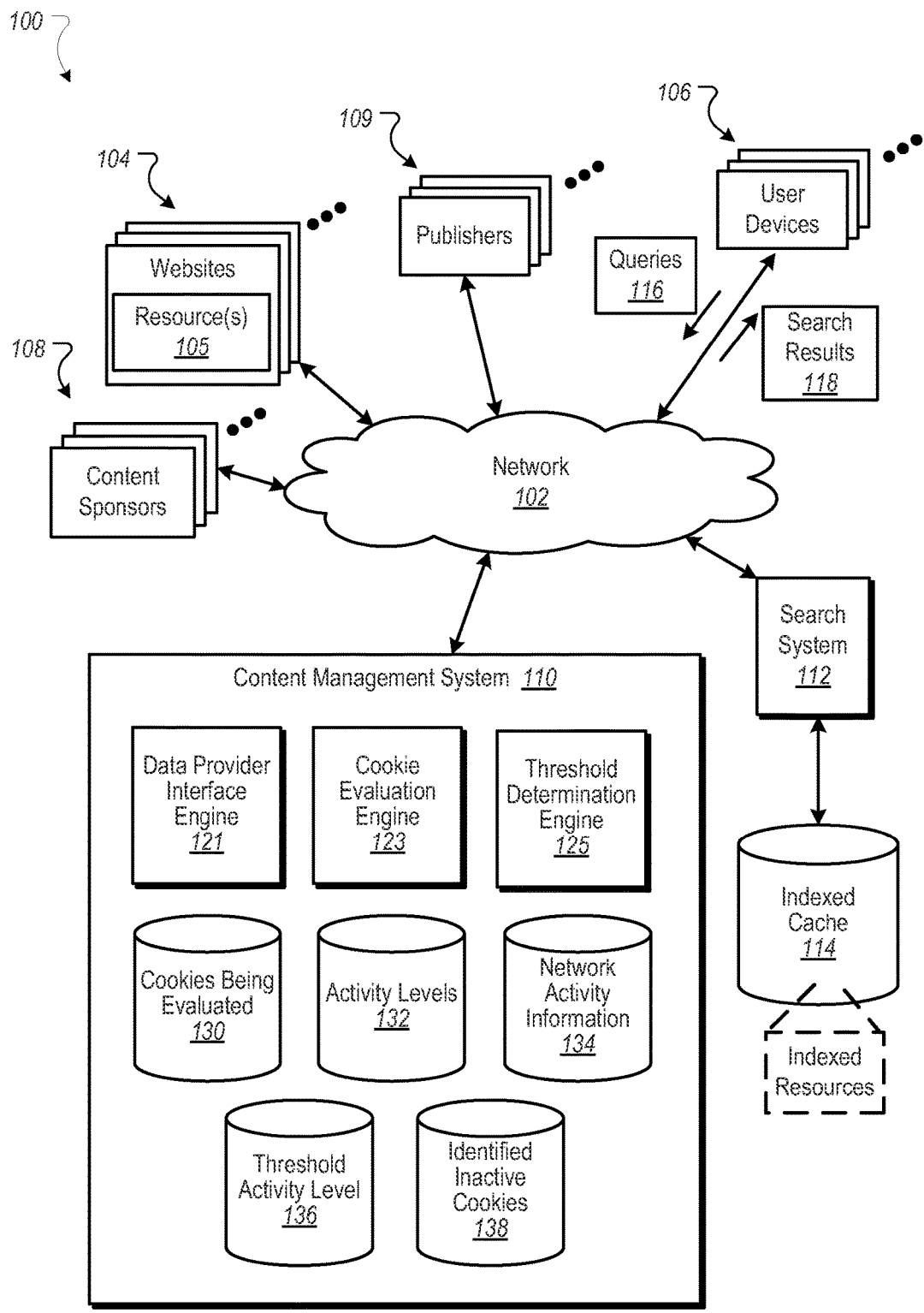
FIG. 1 is a block diagram of an example environment for providing resources.

FIG. 1 is a block diagram of an example environment 100 for providing resources. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), content providers (e.g., publishers 109), and the content management system 110. The example environment 100 may include many thousands of websites 104, user devices 106, content sponsors 108 and publishers 109.

The environment 100 can include plural data stores, which can be stored locally in association with the content management system 110, stored somewhere else and accessible using the network 102, generated as needed from various data sources, or some combination of these. A data store of identifiers (e.g., cookies) being evaluated 130, for example can store cookies received from a data provider and that are to be evaluated. In some implementations, the cookies can be received in the form of a user list. A data store of activity levels 132, for example, can include, for a cookie being evaluated, an activity level for the cookie that has been determined from network activity information for a given cookie. The activity level for a cookie, for example, can be based on activity or inactivity in the network, the age of the cookie, a time since a last cookie match, and/or a number of times that the cookie has been seen. A data store of network activity information 134 can include, for example, information for each cookie that identifies the number of times that the cookie has been seen, including an indication of specific times or time periods that the cookie has been seen. A threshold activity level 136, for example, can be a numeric value and/or some other indicator that can serve as a cut-off point or other measure for determining whether a particular cookie is active and/or the likelihood of being inactive. While reference is made to a binary state (active or inactive), other numbers of states are possible on a spectrum from active to inactive with attending decisions being made depending on a given state of a specific cookie. A data store of identified inactive cookies 138, for example, can include cookies that have been identified as being inactive based on the determined activity level of a respective cookie in relation to the threshold activity level 136. While reference is made to plural different data stores, some or all of the cookie activity information can be stored in a single data structure.

The content management system 110 can include plural engines, some or all of which may be combined or separate, and may be co-located or distributed (e.g., connected over the network 102). A data provider interface engine 121, for example, can receive input from a data provider, the input including one or more user lists or individual cookies associated with users in a network. The input can include, for example, a user list, and each entry in the user list can be associated with a cookie. The data provider interface engine 121 can also report inactive cookies to the data provider. In some implementations, the data provider interface engine 121 can receive input to add one or more cookies that are received to a user list associated with the data provider. The cookies can be added to the user list, for example, irrespective of the activity level associated with the cookie.

A cookie evaluation engine 123, for example, can evaluate cookies and determine an activity level in the network for a given cookie. In some implementations, the activity level for a cookie can be based on activity or inactivity in the network, the age of the cookie, a time since a last cookie match, and/or other criteria. The cookie evaluation engine 123 can also identify inactive cookies based on the determined activity level of a respective cookie and the threshold activity level. The inactive cookies can be reported, e.g., to the data provider associated with the cookies. In some implementations, the cookie evaluation engine 123 can periodically evaluate user lists associated with a given data provider to determine a quality of entries in the user list, including evaluating each cookie associated with the user list as to the threshold activity level. The evaluation can be used, for example, to report on the quality of the user list as a measure of a number of inactive cookies that are associated with the user list. For example, the reporting can include reporting a likelihood that a certain cookie or ones of the cookies is/are inactive. In some implementations, the reporting can include providing information that can be used to present a user interface dashboard to the data provider. The dashboard can include, for example, cookie activity information and quality information associated with one or more user lists that include cookies associated with or provided by the data provider.

A threshold determination engine 125, for example, can determine a threshold activity level. For example, the threshold activity level can be used when evaluating a group of cookies in order to identify a threshold at which each individual cookie is deemed to be active, inactive, and/or other measures of cookie status and/or quality.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a data provider (e.g., a content publisher), which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, gaming consoles, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented.

To facilitate searching of these resources, the environment 100 can include a search system 112 that identifies the resources by, for example, crawling and indexing the resources provided by the content publishers on the websites 104. Data about the resources can be indexed based on the resource to which the data corresponds. The indexed and, optionally, cached copies of the resources can be stored in an indexed cache 114.

When a resource 105 is requested by a user device 106, the content management system 110 can provide the resource. If the resource is a resource for which the data provider uses cookies, a cookie can be generated or retrieved (as appropriate) in association with the user's access of the resource.

Figure 2:
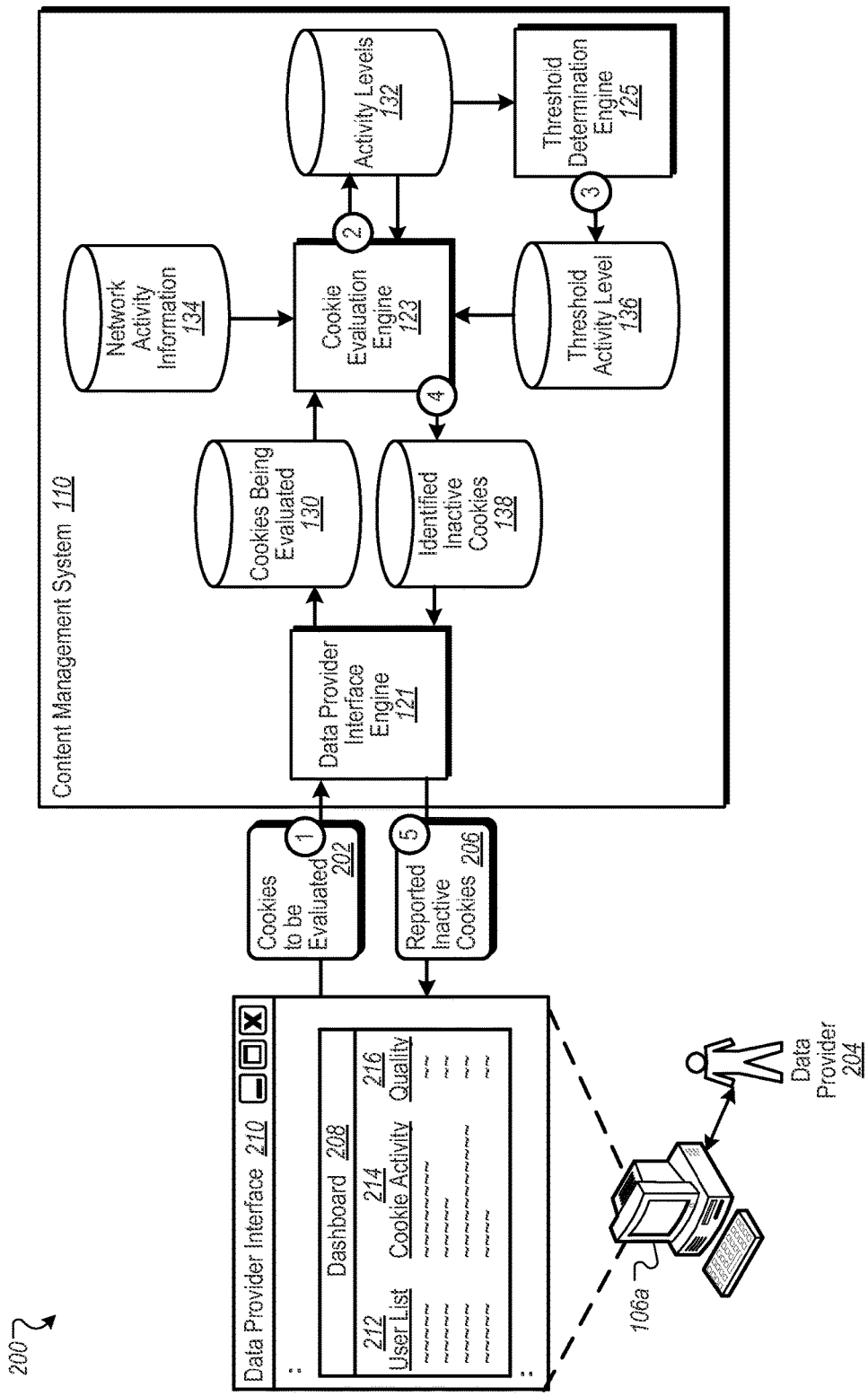
FIG. 2 shows an example system for evaluating identifier quality.

FIG. 2 shows an example system 200 for evaluating identifiers. For example, in the system 200, the content management system 110 can receive input 202 from a data provider 204, such as input (e.g., a user list) that includes cookies to be evaluated associated with users (e.g., a user list) in a network. The content management system 110 can evaluate each cookie, including determining an activity level in the network for each cookie. Cookies can be determined to be active or inactive, for example, based on comparing a respective cookie's activity level in the network to a threshold activity level that is determined by the content management system 110. Inactive cookies 206 can be reported back to the data provider 204. In some implementations, providing feedback in association with identifiers processed by the system 200 can occur in the following example sequence of stages.

At step 1, for example, the data provider interface engine 121 can receive input 202 from the data provider 204, the input including one or more cookies associated with users in a network. For example, the input 202 can include a user list, associated with plural users in the network, and each entry in the user list can include or be associated with a cookie. The cookies that are received for evaluation can be stored in the data store of cookies being evaluated 130.

At step 2, for example, the cookie evaluation engine 123 can evaluate each of the cookies and determine an activity level in the network for a given cookie. The activity level for a cookie, for example, can be based on activity or inactivity in the network, the age of the cookie, or a time since a last cookie match. For example, to determine a cookie's activity level, the cookie evaluation engine 123 can access network activity information 134. The information can include for each cookie, for example, information that identifies a number of times that the cookie has been seen. In some implementations, the activity level for each of the cookies can be stored in the data store of activity levels 132.

At step 3, for example, the threshold determination engine 125 can determine a threshold activity level 136. For example, the threshold activity level 136 can be a numeric value and/or some other indicator that can serve as a cut-off point or other measure for determining whether a particular cookie is active and/or the likelihood of being inactive.

At step 4, for example, the cookie evaluation engine 123 can identify inactive cookies based on the determined activity level of a respective cookie and threshold activity level. For example, for each of the cookies being evaluated 130, the cookie evaluation engine 123 can compare that cookie's activity level 132 with the threshold activity level 136. Cookies that are identified as being inactive can be stored, for example, in the identified inactive cookies 138.

At step 5, for example, the data provider interface engine 121 can report inactive cookies. For example, the data provider interface engine 121 can use the identified inactive cookies 138 to provide reported inactive cookies 206 to the data provider 204. The information reported to the data provider 204, for example, can include a likelihood that a particular cookie is inactive.

In some implementations, information provided with the reported inactive cookies 206 can be used to present a user interface dashboard 208 to the data provider 204. For example, the user interface dashboard 208 can be presented to the data provider 204 in a data provider interface 210 displayed on a user device 106a. Other data providers 204 and/or other users can use the same or different interfaces for displaying information associated with inactive cookies. The user interface dashboard 208, for example, can display information for user lists 212, cookie activity 214, and user list quality 216. Other information can be presented. In some implementations, controls can be provided in the dashboard 208 for obtaining additional information, e.g., to drill down to specific cookies within a particular user list 212. Drill down information can include, for example, active/inactive indicators for a cookie, probabilities identifying particular cookies' likelihood of being inactive, specific dates and times of cookie activity, and/or other information.

Figure 3:
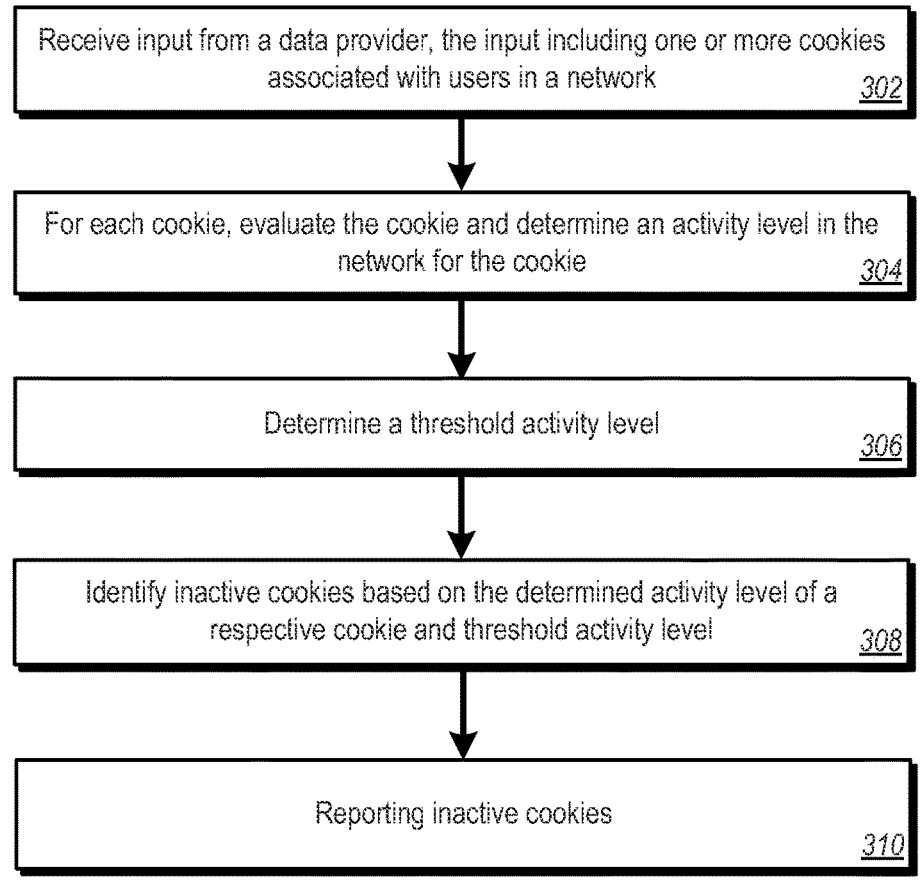
FIG. 3 is a flowchart of an example process for evaluating identifier quality.

FIG. 3 is a flowchart of an example process 300 for evaluating identifiers. In some implementations, the content management system 110 can perform stages of the process 300 using instructions that are executed by one or more processors. FIGS. 1-2 are used to provide example structures for performing the steps of the process 300.

Input is received from a data provider, the input including one or more identifiers (e.g., cookies) associated with users in a network (302). As an example, the data provider interface engine 121 can receive the input 202 from the data provider 204. The input 202 can include one or more cookies associated with users in a network. The data store of cookies being evaluated 130, for example, can store the cookies that are received for evaluation from the data provider 204.

In some implementations, receiving input can include receiving a user list that includes a plurality of entries, each entry including a cookie. For example, the input 202 can include a user list that is associated with plural users in the network, and each entry in the user list can include or be associated with a cookie.

Each cookie is evaluated, and an activity level in the network for a given cookie is determined (304). As an example, the cookie evaluation engine 123 can evaluate each of the cookies received from the data provider 204 and determine, for each cookie, an activity level in the network. For example, each cookie's activity level can be based on activity or inactivity in the network, the age of the cookie, or a time since a last cookie match. For example, to determine a cookie's activity level, the cookie evaluation engine 123 can access network activity information 134 that can include, for each cookie, information that identifies a number of times that the cookie has been seen. In some implementations, the activity level for each of the cookies can be stored in the data store of activity levels 132.

In some implementations, determining the activity level in the network for a given cookie can include determining, in a time period, a number of times that the cookie has been seen. The cookie evaluation engine 123, for example, can use the network activity information 134 to identify the number of times that each cookie has been seen in any of various time periods, e.g., measured in hours, days, weeks, months or longer. In some implementations, the activity level can include distributions of viewing counts by time period, including a time since the last viewing of the cookie.

A threshold activity level is determined (306). For example, the threshold determination engine 125 can be based on one or more criteria. The criteria can be associated with a specific network or a specific data provider and can be based on input associated with the data provider or others users in the system. The criteria can be used to define plural activity levels. In addition, a confidence level associated with a given assignment can be made. Using the threshold activity level and confidence information, for example, the threshold determination engine 125 can determine the threshold activity level 136.

In some implementations, the activity level can be based on activity or inactivity in the network, an age of the cookie, or a time since a last cookie match. For example, the threshold activity level 136 can include multiple threshold activity levels for determining when a cookie is inactive, e.g., no viewings in the last week, few or no viewings in the last month, or some other thresholds.

Inactive cookies are identified based on the determined activity level of a respective cookie and the threshold activity level (308). The cookie evaluation engine 123 can use the one or more threshold activity levels 136 to determine which of the cookies being evaluated 130 are inactive, e.g., based on the activity levels 132 for each cookie.

Inactive cookies are reported (310). As an example, the data provider interface engine 121 can provide a list of the identified inactive cookies 138 to the data provider 204. The identified inactive cookies 138, for example, can identify specific cookies that are inactive.

In some implementations, reporting can include reporting a likelihood that a certain cookie is inactive. For example, information about the reported inactive cookies 206 can include, for inactive cookies, probabilities (e.g., P %) that a particular cookie is inactive.

In some implementations, reporting inactive cookies can include reporting inactive cookies to the data provider 204 responsive to the received input. For example, the reported inactive cookies can be relative to the received input 202.

In some implementations, reporting inactive cookies can be periodic and can include evaluating all cookies in a user list and reporting a quality of the user list based on the evaluating. For example, the data provider 204 can submit the same user list plural times as the input 202. In each time, the content management system 110 can determine a quality score for the user list. The quality score may decrease over time, and the data provider 204 may keep using the user list, for example, until the quality score reaches a specific quality level, at which time the data provider 204 may stop using the user list (or just stop using the cookies that are inactive). In some implementations, the cookie evaluation engine can evaluate the cookie quality periodically, e.g., for a user list, and make the quality information available to data providers 204 (e.g., through downloads). In some implementations, the content management system 110 can periodically send the identified inactive cookie to data providers 204.

In some implementations, the quality can be measured in terms of number of inactive cookies to active cookies. For example, the quality of a particular user list can be a ratio of the number of active cookies to inactive cookies, e.g., a quotient of 200 inactive cookies to 800 active cookies.

In some implementations, reporting can include reporting a quality score or other measure of the user list to a potential entity that may use or access the user list. For example, the content management system 110 can report the quality of a particular user list to any entity (data provider 204, etc.) that may use/subscribe to the user list for some purpose (e.g., advertising or content selection). In some implementations, the content management system 110 can compute overall cookie quality at the data provider level. For example, data providers 204 (e.g., content sponsors 108) can use the information associated with cookie quality when selecting user lists for which to select their content (e.g., advertisement creatives).

In some implementations, reporting the quality can include reporting a percentage of inactive cookies in the user list. For example, the reported inactive cookies 206 can indicate that the input 202, of the cookies being evaluated, identifies a user list in which 20% (or some other percentage) of the cookies are inactive.

In some implementations, receiving input can include receiving input to add one or more cookies to a user list associated with the data provider, and reporting inactive cookies can include reporting back to the data provider 204 to identify which of the provided one or more cookies are deemed inactive. For example, the input 202 that is provided by the data provider 204 can include one or more cookies that the data provider 204 wishes to add to an existing user list. The content management system 110 can evaluate the received cookies and identify which of the cookies are inactive, e.g., so that only the active cookies will be added to the user list.

In some implementations, the method can further include adding the cookies to the user list irrespective of activity level. For example, if the input 202 that is provided by the data provider 204 includes one or more cookies to be added to an existing user list, the content management system 110 can add the cookies to the user list even if evaluation of the cookies has indicated that certain cookies are inactive. In some implementations, each of the cookies in a user list can have an associated active probability, and data providers 204 can decide, in each of plural opportunities to use the user list, to use only the cookies having an active probability above a particular threshold.

In some implementations, the method can further include periodically evaluating the user list to determine a quality of entries in the user list, including evaluating each cookie associated with the user list as to the threshold activity level, and reporting can include reporting the quality of the user list as a measure of a number of inactive cookies that are associated with the user list. For example, the input 202 can be a user list provided by the data provider 204 that is received periodically at the content management system 110, or received once and stored locally at the content management system 110. Periodically, each time the user list is evaluated, the cookie evaluation engine 123 can determine the activity level for each cookie, and use the information to identify a number of inactive cookies in the user list. The content management system 110 can report the identified number to the data provider 204.

In some implementations, the method can further include, when the number of inactive cookies is above a first threshold, triggering a cookie-matching process for the data provider. For example, at pre-determined intervals (e.g., every two months), the content management system 110 can trigger a process that matches all of the cookies. In some implementations, information that is determining during the cookie-matching process can include a report of which cookies are inactive, the overall quality score of a user list, and/or information that indicates that cookie-matching should occur more often. Other information can be provided. Cookie matching is a process, for example, that enables a data provider to associate two kinds of data: the cookie that identifies a user within the data provider domain, and the double-click cookie that identifies the user, e.g., to the content management system 110. In some implementations, a data structure that the data provider can use to maintain these associations is called a match table. For example, while the data provider can be responsible for building and maintaining match tables, the content management system 110 can host them.

In some implementations, reporting can include providing information for presenting a user interface dashboard to the data provider that includes cookie activity information and quality information associated with one or more user lists that include cookies that the data provider has submitted. For example, the content management system 110 can use information known about user lists and corresponding active/inactive cookies associated with a particular data provider 204 to generate information to include in the dashboard 208.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processers embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving input from an electronic user interface of a data provider, the input identifying one or more cookies associated with users in a network;
   monitoring, by one or more processors, network activity and detecting cookies that are included in the network activity;
   determining, based on the monitoring, that a given cookie of the one or more cookies has not been detected in the network activity for more than a specified amount of time;
   identifying the given cookie as an inactive cookie based on the determination that the given cookie has not been detected in the network activity for more than the specified amount of time;
   updating the electronic user interface of the data provider to visually identify, in a user list that includes multiple different cookies, an entry associated with the inactive cookie;
   determining a quality score for the user list based on a ratio of a number of the inactive cookies in the user list to a total number of the multiple different cookies in the user list;
   providing the quality score through the electronic user interface of the data provider; and
   halting use of the user list when the quality score falls below a specified quality score.

2. The method of claim 1 wherein receiving input includes receiving a user list that includes a plurality of entries, each entry including a cookie.

3. The method of claim 1 wherein identifying the given cookie as an inactive cookie includes determining, in a time period, a number of times that the cookie has been seen, and comparing the number of times to a threshold activity level.

4. The method of claim 1 wherein receiving input includes receiving input to add the one or more cookies to a user list associated with the data provider, and wherein updating the electronic user interface includes reporting back to the data provider which of the one or more cookies are deemed inactive.

5. The method of claim 4 further comprising adding the cookies to the user list irrespective of whether the cookies are identified as inactive cookies.

6. The method of claim 4 further comprising periodically evaluating the user list to determine a quality of entries in the user list, including evaluating each cookie associated with the user list as to a threshold activity level, and wherein updating the electronic user interface includes reporting the quality of the user list as a measure of a number of inactive cookies that are associated with the user list.

7. The method of claim 4 wherein updating the electronic user interface includes reporting inactive cookies to the data provider responsive to the received input.

8. The method of claim 4 wherein updating the electronic user interface is periodic and includes evaluating all cookies in the user list and reporting a quality of the user list based on the evaluating.

9. The method of claim 8 wherein the quality is measured in terms of a number of inactive cookies to active cookies.

10. The method of claim 4 wherein updating the electronic user interface includes reporting a quality of the user list to a potential entity that may use or access the user list.

11. The method of claim 10 wherein reporting the quality includes reporting a percentage of inactive cookies in the user list.

12. The method of claim 1 wherein monitoring network activity is based on activity or inactivity in the network, an age of the cookie, or a time since a last cookie match.

13. The method of claim 1 further comprising reporting a likelihood that a certain cookie is inactive.

14. The method of claim 1 further comprising, when a number of inactive cookies is above a first threshold, triggering a cookie-matching process for the data provider.

15. The method of claim 1 further comprising providing information for presenting a user interface dashboard to the data provider that includes cookie activity information and quality information associated with one or more user lists that include cookies that the data provider has submitted.

16. A non-transitory computer-readable medium storing instructions, that when executed, cause one or more processors to:
receive input from an electronic user interface of a data provider, the input including one or more cookies associated with users in a network;
monitor, by one or more processors, network activity and detect cookies that are included in the network activity;
determine, based on the monitoring, that a given cookie of the one or more cookies has not been detected in the network activity for more than a specified amount of time;
identify the given cookie as an inactive cookie based on the determination that the given cookie has not been detected in the network activity for more than the specified amount of time;
update the electronic user interface of the data provider to visually identify, in a user list that includes multiple different cookies, an entry associated with the inactive cookie;
determine a quality score for the user list based on a ratio of a number of the inactive cookies in the user list to a total number of the multiple different cookies in the user list;
provide the quality score through the electronic user interface of the data provider; and
halt use of the user list when the quality score falls below a specified quality score.

17. The non-transitory computer-readable medium of claim 16 wherein receiving input includes receiving a user list that includes a plurality of entries, each entry including a cookie.

18. The non-transitory computer-readable medium of claim 16 wherein identifying the given cookie as an inactive cookie includes determining, in a time period, a number of times that the cookie has been seen, and comparing the number of times to a threshold activity level.

19. A system comprising:
one or more processors; and
one or more memory elements including instructions that, when executed, cause the one or more processors to:
receive input from an electronic user interface of a data provider, the input including one or more cookies associated with users in a network;
monitor, by one or more processors, network activity and detect cookies that are included in the network activity;
determine, based on the monitoring, that a given cookie of the one or more cookies has not been detected in the network activity for more than a specified amount of time;
identify the given cookie as an inactive cookie based on the determination that the given cookie has not been detected in the network activity for more than the specified amount of time;
update the electronic user interface of the data provider to visually identify, in a user list that includes multiple different cookies, an entry associated with the inactive cookie;
determine a quality score for the user list based on a ratio of a number of the inactive cookies in the user list to a total number of the multiple different cookies in the user list;
provide the quality score through the electronic user interface of the data provider; and
halt use of the user list when the quality score falls below a specified quality score.

20. The system of claim 19 wherein receiving input includes receiving a user list that includes a plurality of entries, each entry including a cookie.

* * * * *